United States Patent
Fujime

(10) Patent No.: US 8,831,834 B2
(45) Date of Patent: Sep. 9, 2014

(54) VEHICLE INFORMATION MANAGEMENT SYSTEM

(71) Applicant: Yamaha Hatsudoki Kabushiki Kaisha, Iwata (JP)

(72) Inventor: Yoko Fujime, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 177 days.

(21) Appl. No.: 13/681,512

(22) Filed: Nov. 20, 2012

(65) Prior Publication Data

US 2014/0015661 A1    Jan. 16, 2014

(30) Foreign Application Priority Data

Jul. 12, 2012    (JP) .................................. 2012-156403

(51) Int. Cl.
| | | |
|---|---|---|
| G06F 17/00 | (2006.01) | |
| G07C 5/08 | (2006.01) | |
| B60Q 1/00 | (2006.01) | |

(52) U.S. Cl.
CPC .............. *G06F 17/00* (2013.01); *G07C 5/0808* (2013.01); *B60Q 1/00* (2013.01)
USPC ................ 701/43; 701/33.4; 701/67; 701/99; 340/438

(58) Field of Classification Search
USPC ........................... 701/4, 33.4, 67, 99; 340/438
See application file for complete search history.

(56) References Cited

U.S. PATENT DOCUMENTS

| | | | |
|---|---|---|---|
| 4,587,615 A * | 5/1986 | Takahashi ..................... | 701/114 |
| 4,975,848 A | 12/1990 | Abe et al. | |
| 6,030,261 A | 2/2000 | Motose | |
| 6,931,309 B2 * | 8/2005 | Phelan et al. ..................... | 701/1 |
| 2006/0282565 A1 | 12/2006 | Kumaido et al. | |
| 2009/0316320 A1 | 12/2009 | Maeda et al. | |
| 2011/0276842 A1 | 11/2011 | Shibamori et al. | |
| 2013/0041522 A1 * | 2/2013 | Mori et al. ......................... | 701/1 |
| 2014/0019024 A1 * | 1/2014 | Fujime ............................ | 701/99 |

FOREIGN PATENT DOCUMENTS

| | | | |
|---|---|---|---|
| JP | 62-291537 A | 12/1987 | |
| JP | 64-083435 A | 3/1989 | |
| JP | 07-295822 A | 11/1995 | |
| JP | 08-201233 A | 8/1996 | |
| JP | 08-270494 A | 10/1996 | |
| JP | 10-238397 A | 9/1998 | |

(Continued)

OTHER PUBLICATIONS

Fujime, "Vehicle Information Management System," U.S. Appl. No. 13/681,518, filed Nov. 20, 2012.

*Primary Examiner* — Mary Cheung
*Assistant Examiner* — Michael Berns
(74) *Attorney, Agent, or Firm* — Keating & Bennett, LLP

(57) ABSTRACT

In a vehicle information management system, a storage includes a storage region arranged to store abnormality data that includes diagnostic data, type information indicating a type of an abnormality, and occurrence number information that indicates the number of occurrences of each abnormality specified by the type information. When the type of an abnormality is specified by an abnormality specifying unit and a new diagnostic data is produced and if the abnormality data of the same type as the specified type is already stored in the storage region in the storage, an updating unit changes the occurrence number information to the latest information and overwrites and saves the diagnostic data in the storage region already stored with the abnormality data of the same type as the specified type.

10 Claims, 7 Drawing Sheets

(56) References Cited

FOREIGN PATENT DOCUMENTS

| | | |
|---|---|---|
| JP | 2005-041273 A | 2/2005 |
| JP | 2007-015683 A | 1/2007 |
| JP | 2008-117129 A | 5/2008 |
| JP | 2010-004617 A | 1/2010 |
| JP | 2011-070397 A | 4/2011 |
| JP | 2011-230633 A | 11/2011 |
| WO | WO0017721 A2 * | 3/2000 ............. G05B 23/02 |

* cited by examiner

Fig.2

| | 1ST STORAGE REGION | 2ND STORAGE REGION | 3RD STORAGE REGION |
|---|---|---|---|
| ABNORMALITY TYPE NUMBER | 13 | 24 | 43 |
| VEHICLE SPEED | 55 | 60 | 35 |
| BATTERY VOLTAGE | 10 | 13 | 11 |
| ENGINE TEMPERATURE | 75 | 75 | 79 |
| THROTTLE OPENING DEGREE | 25 | 10 | 15 |
| IGNITION | 45 | 50 | 60 |
| INJECTION | 18 | 20 | 18 |
| IG CYCLE | 46 | 81 | 81 |
| ENGINE REVOLUTION NUMBER | 1526 | 2212 | 2118 |
| INCLINATION ANGLE | 5 | 30 | 17 |
| CURRENT CARRYING TIME | 38 | 41 | 62 |
| OCCURRENCE NUMBER | 1 | 1 | 2 |

A

VEHICLE INFORMATION MANAGEMENT SYSTEM

BACKGROUND OF THE INVENTION

1. Field of the Invention

The present invention relates to vehicle information management systems and more specifically to a vehicle information management system that manages freeze frame data.

2. Description of the Related Art

There is a known vehicle adapted to store freeze frame data for a vehicle in storage in order to use it to diagnose and repair a malfunction for the occasion of an abnormality generated in the vehicle. Here, the freeze frame data refers to data that includes parameters related to a vehicle state and is used for diagnosing a malfunction in the vehicle. When the vehicle is diagnosed or repaired, the freeze frame data is read out from the storage using an external device. A worker in charge of repair and maintenance specifies the cause of the malfunction or the like based on the read out freeze frame data.

If all of the freeze frame data obtained upon detecting an abnormality about a vehicle is stored, a storage with a large storage capacity is necessary, and it takes time to search for data necessary for clarifying the cause of the malfunction at the time of diagnosing and repairing the vehicle. There is a known method of storing two kinds of freeze frame data, i.e., freeze frame data obtained when an abnormality occurs for the first time and freeze frame data obtained when an abnormality occurs for the last time in order to solve the problems (see JP-A 2005-41273).

In a diagnostic data collecting device disclosed by JP-A 2005-41273, a storage includes first and second storage regions. Freeze frame data obtained upon detecting an abnormality for the first time is stored in the first storage region. Freeze frame data obtained upon detecting an abnormality for the last time is stored in the second storing region.

The diagnostic data collecting device disclosed by JP-A 2005-41273 needs two storage regions for one type of abnormality. Therefore, a large storage capacity is necessary. In order to reduce the storage capacity, one of the two storage regions could be removed, and only one storage region would be provided. In the arrangement with only one storage region, it is not preferable to store freeze frame data obtained upon detecting an abnormality for the first time in view of how to repair the vehicle or the like and only the latest freeze frame data is stored in the storage region. However, depending on the type of an abnormality, it may be difficult to specify the content of the abnormality only based on the latest freeze frame data.

SUMMARY OF THE INVENTION

Preferred embodiments of the present invention provide a vehicle information management system without requiring a large capacity storage yet allows an abnormality and a malfunction to be easily specified.

According to a preferred embodiment of the present invention, a vehicle information management system manages diagnostic data that indicates a vehicle state and includes a plurality of parameter detectors, an abnormality specifying unit, a diagnostic data producing unit, a storage, and an updating unit. The parameter detectors each detect a parameter related to the vehicle state. The abnormality specifying unit specifies a type of an abnormality generated in the vehicle based on the parameters detected by the parameter detectors. The diagnostic data producing unit produces the diagnostic data based on the parameters detected by the parameter detectors when a type of an abnormality is specified by the abnormality specifying unit. The storage includes a storage region capable of storing abnormality data including the diagnostic data, type information that indicates the type of the abnormality, and occurrence number information that indicates the number of occurrences of the abnormality specified by the type information. When a type of an abnormality is specified by the abnormality specifying unit and a new diagnostic data is produced and if abnormality data of the same type as the specified type is already stored in the storage region in the storage, the updating unit changes the occurrence number information to the latest information and overwrites and saves the diagnostic data in the storage region already stored with the abnormality data of the same type as the specified type.

According to the above-described vehicle information management system, the latest diagnostic data useful in specifying an abnormality and a malfunction is stored in the storage region. Since the occurrence number information is changed to the latest information, consecutively occurring abnormalities can be specified. It can be determined that stored diagnostic data is not diagnostic data obtained when the abnormality occurred for the first time based on the occurrence number information. Therefore, as compared to the arrangement in which only the latest diagnostic data is stored, abnormalities and malfunctions can be specified more easily. Therefore, in the above-described vehicle information management system, a large capacity storage is not necessary and abnormalities and malfunctions are likely to be specified more easily.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 2 is a table showing a specific example of abnormality data stored in a storage region.

DETAILED DESCRIPTION OF THE PREFERRED EMBODIMENTS

Figure 1:
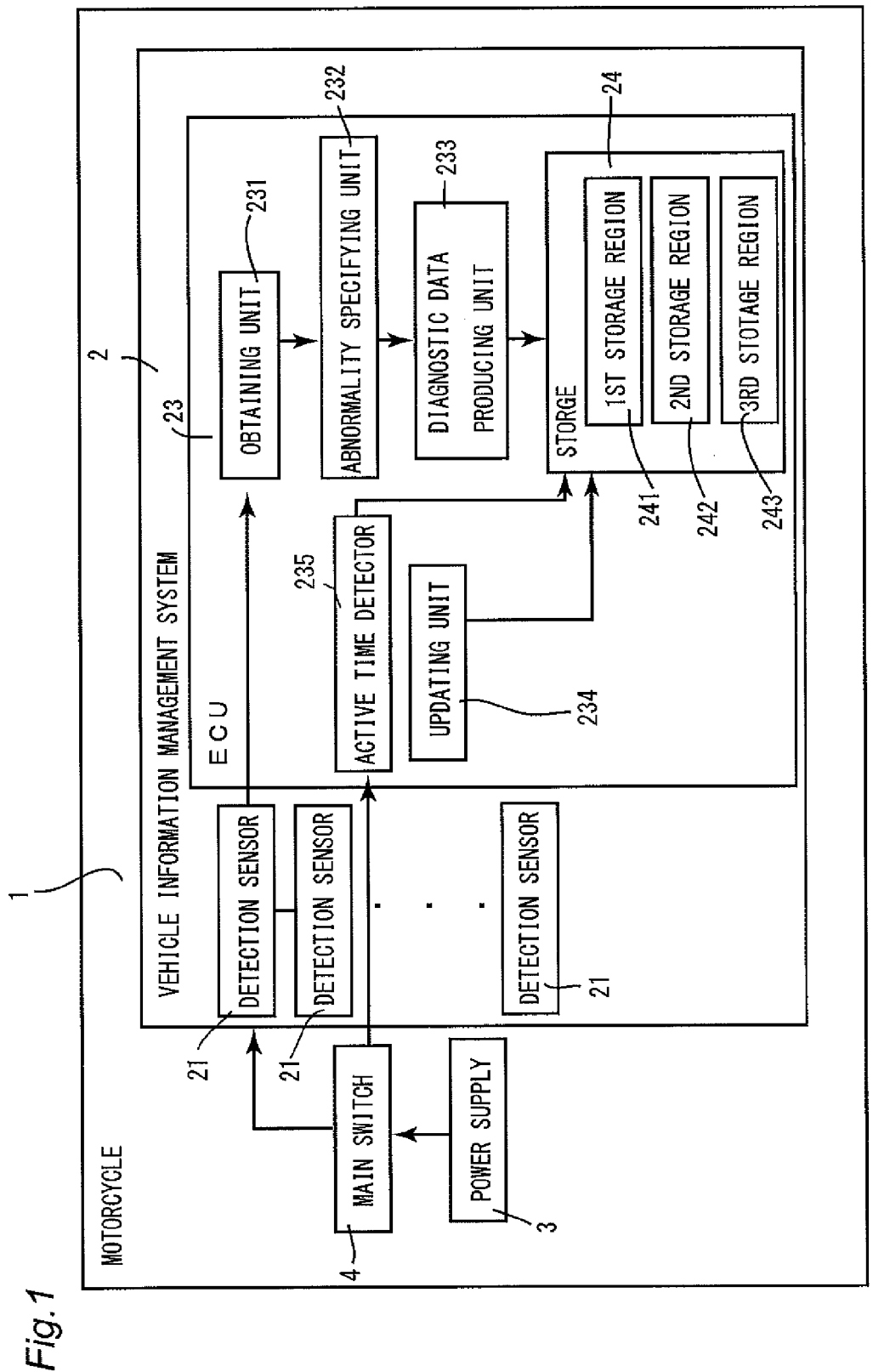
FIG. 1 is a block diagram showing a structure of a motorcycle according to a preferred embodiment of the present invention.

Some vehicles include an arrangement adapted to store freeze frame data that indicates a vehicle state in a storage in order to specify the cause of a malfunction upon the occurrence of an abnormality in the vehicle. When an abnormality is detected in such a vehicle, the freeze frame data is obtained and stored in the storage. When the vehicle is repaired, a repair worker reads out the freeze frame data from the storage and specifies the type of the malfunction or the like.

If all of the freeze frame data obtained upon detecting an abnormality about a vehicle is stored, a large storage capacity is necessary and much time is required to determine the cause of a malfunction in specifying or repairing the malfunction. In order to solve these problems, there has been an idea of an arrangement adapted to store two kinds of data, i.e., freeze frame data obtained upon detecting an abnormality for the first time and freeze frame data obtained upon detecting an abnormality for the last time.

The inventor of the preferred embodiments of the present invention has come up with an idea of a vehicle information management system having a structure that does not need a large capacity storage and allows an abnormality and a malfunction to be easily specified. In the vehicle information management system according to the preferred embodiments of the present invention, abnormality data (freeze frame data) includes occurrence number information that indicates the number of occurrences for each abnormality. Therefore, the number of occurrences of abnormalities of the same type is available from the occurrence number information in the abnormality data. It can be determined that abnormality data stored in a storage is not abnormality data obtained upon detecting an abnormality for the first time when the abnormality is to be specified and a malfunction is diagnosed.

In the above-described vehicle information management system, abnormality data stored in a storage region includes occurrence number information. If a rider discovers an abnormality and takes the vehicle including the above-described vehicle information diagnostic system to a shop for repair, a repair worker can obtain information about the frequency of occurrences of the abnormality from the rider. Therefore, the repair worker can more easily determine which storage region stores abnormality data that should be referred to based on the information from the rider and the abnormality data.

Now, a motorcycle 1 as a kind of a saddle riding type vehicle according to one preferred embodiment of the present invention will be described in conjunction with the accompanying drawings. In the drawings, the same or corresponding portions are designated by the same reference characters and description about each element will not be repeated.

FIG. 1 is a block diagram of an overall structure of the motorcycle 1. The motorcycle 1 includes a vehicle information management system 2, a power supply 3, and a main switch 4.

The vehicle information management system 2 includes a plurality of detection sensors 21 and an ECU (electronic control unit) 23. The plurality of detection sensors 21 (each corresponding to a parameter detector) are provided in an engine of the motorcycle 1, the power supply 3, and the like. The detection sensors 21 each detect a parameter related to a vehicle state. For example, the plurality of detection sensors 21 include various sensors such as a vehicle speed sensor that detects a vehicle speed and a throttle sensor. The plurality of detection sensors 21 are connected to the ECU 23.

The ECU 23 controls the engine and the like. The ECU 23 includes an obtaining unit 231, an abnormality specifying unit 232, a diagnostic data producing unit 233, an updating unit 234, an active time detector 235, and a storage 24.

The obtaining unit 231 obtains parameters about a vehicle state from the plurality of detection sensors 21. The abnormality specifying unit 232 specifies the type of an abnormality about the vehicle based on the parameters obtained by the obtaining unit 231. The abnormality specifying unit 232 determines whether the parameters detected by the detection sensors 21 are each within a predetermined normal range and specifies the type of the abnormality based on parameters outside of the normal range. The abnormality specifying unit 232 specifies the type of the abnormality based on the abnormality specifying data stored in the storage 24. The abnormality specifying data is data that associates an abnormality type and a range of a parameter outside which an abnormality is determined for each parameter.

In the motorcycle 1, a condition to determine recovery is different among different types of abnormalities. In the motorcycle 1, if a disconnection in a detection sensor 21 is caused, for example, and connection of a line is later detected, it is determined that the disconnection in the detector sensor 21 has been repaired. If there is an abnormality about an ignition device for the engine, for example, it is difficult to determine recovery from the abnormality correctly. Therefore, when the main switch 4 is turned off from its on state, it is determined that the motorcycle 1 has recovered from the abnormality in the ignition device. In this way, the conditions to determine recovery from abnormalities are different depending on the types of abnormalities. The association between the abnormalities and corresponding recovery conditions are stored in the storage 24.

The diagnostic data producing unit 233 produces diagnostic data based on parameters detected by the plurality of detection sensors 21 when the abnormality specifying unit 232 specifies an abnormality. The diagnostic data producing unit 233 arranges the parameters in a predetermined order to produce the diagnostic data.

The updating unit 234 updates abnormality data (freeze frame data) stored in the storage 24. Here, the abnormality data includes diagnostic data, type information that indicates an abnormality type, occurrence number information that indicates the number of occurrences of the abnormality specified by the type information, and time information that indicates a time during which the ECU 23 is active. When new diagnostic data is produced and abnormality data of the same type as the abnormality type specified by the abnormality specifying unit 232 is already stored in the storage 24, the updating unit 234 changes the occurrence number information to the latest information and overwrites the diagnostic data and the time information. Here, changing to the latest information indicates changing the occurrence number information to the latest information based on the occurrence number information already stored in the storage 24. The overwriting indicates storing new data in the storage 24 in place of the data already stored in the storage 24.

When a new diagnostic data is produced, and if abnormality data of the same type as that of the abnormality specified by the abnormality specifying unit 232 is not stored in the storage 24 and there is an empty storage region (hereinafter "empty region") in the storage 24, the updating unit 234 stores newly produced abnormality data in the empty region. The active time detector 235 detects a period during which the ECU 23 is active.

The storage 24 pre-stores various kinds of data and information including abnormality specifying data used to specify an abnormality. The storage 24 includes, for example, first, second, and third storage regions 241, 242, and 243. Each of the storage regions stores only one piece of abnormality data.

The power supply 3 supplies power to devices or the like provided in the vehicle. The power supply 3 supplies power to the ECU 23 and the plurality of detection sensors 21. The main switch 4 is provided between the power supply 3 and the plurality of detection sensors 21 and between the power supply 3 and the vehicle information management system 2. The main switch 4 responds to an operation of the ignition key by a rider to switch whether or not to supply power from the power supply 3 to the plurality of detection sensors 21 and the vehicle information management system 2.

When the main switch 4 is switched from off to on, the detection sensors 21 start to detect parameters. At this time, the detected parameters are obtained by the obtaining unit 231. The ECU 23 carries out control to detect an abnormality. The type of an abnormality of the motorcycle 1 is specified based on the detected parameters. However, if there is an abnormality in the ignition device for the engine, for example, and the switch 4 is switched from on to off, the motorcycle 1 determines that the abnormality in the ignition device has been recovered. Therefore, if it is determined that there is an abnormality in the ignition device for the engine in the motorcycle 1, the ECU 23 determines recovery from the abnormality in response to switching of the main switch 4 from on to off even while it is actually not recovered from the abnormality. Therefore, when the main switch 4 is switched from off to on, the abnormality in the ignition device is detected once again. However, in reality, the abnormality in the ignition device has not occurred again but it continues to exist from the first occurrence. Therefore, diagnostic data obtained when the abnormality in the ignition device occurred for the first time is more important in specifying and repairing the abnormality than diagnostic data based on the parameters detected as the main switch 4 is switched from off to on.

In the motorcycle 1, when abnormality data related to an abnormality of the same type as that of an abnormality specified when the main switch 4 is switched from off to on is already stored in the storage 24, the updating unit 234 does not update the abnormality data. In this case, the updating unit 234 does not store the abnormality data in any of the other storage regions. In this way, for the above-described abnormality in the ignition device for the engine, diagnostic data obtained when an abnormality occurred in the ignition device for the first time that is critical in specifying and repairing the abnormality can be maintained as it is stored in the storage 24.

If abnormality data related to an abnormality of the same type as the type of the abnormality specified upon producing new diagnostic data is not stored in the storage 24 and there is no empty region in the storage 24, the updating unit 234 deletes the oldest abnormality data from all the storage regions to produce an empty region and stores the newly produced abnormality data in the empty region. Here, the updating unit 234 determines the oldest data based on time information included in the abnormality data stored in each of the storage regions.

FIG. 2 shows an example of abnormality data stored in the storage region 24. One piece of abnormality data is stored in each of the storage regions in the storage 24. The items and numerical values of the abnormality data shown in FIG. 2 are examples only and they are not limited to these examples. For example, the number of items of abnormality data may be different from the number shown in FIG. 2.

An abnormality type number included in the items of the abnormality data shown in FIG. 2 represents the type of an abnormality by a number. In the motorcycle 1, abnormality type numbers are previously set for the types of abnormalities, and abnormality data includes an abnormality type number corresponding to each of the abnormalities. The abnormality data includes information related to current carrying time that indicates an active time during which the ECU 23 is active and information related to the number of how many times an abnormality designated by the abnormality type number occurred in addition to items related to the vehicle state. In the abnormality data shown in FIG. 2, the diagnostic data is data related to items in the range represented by A.

Figure 3:
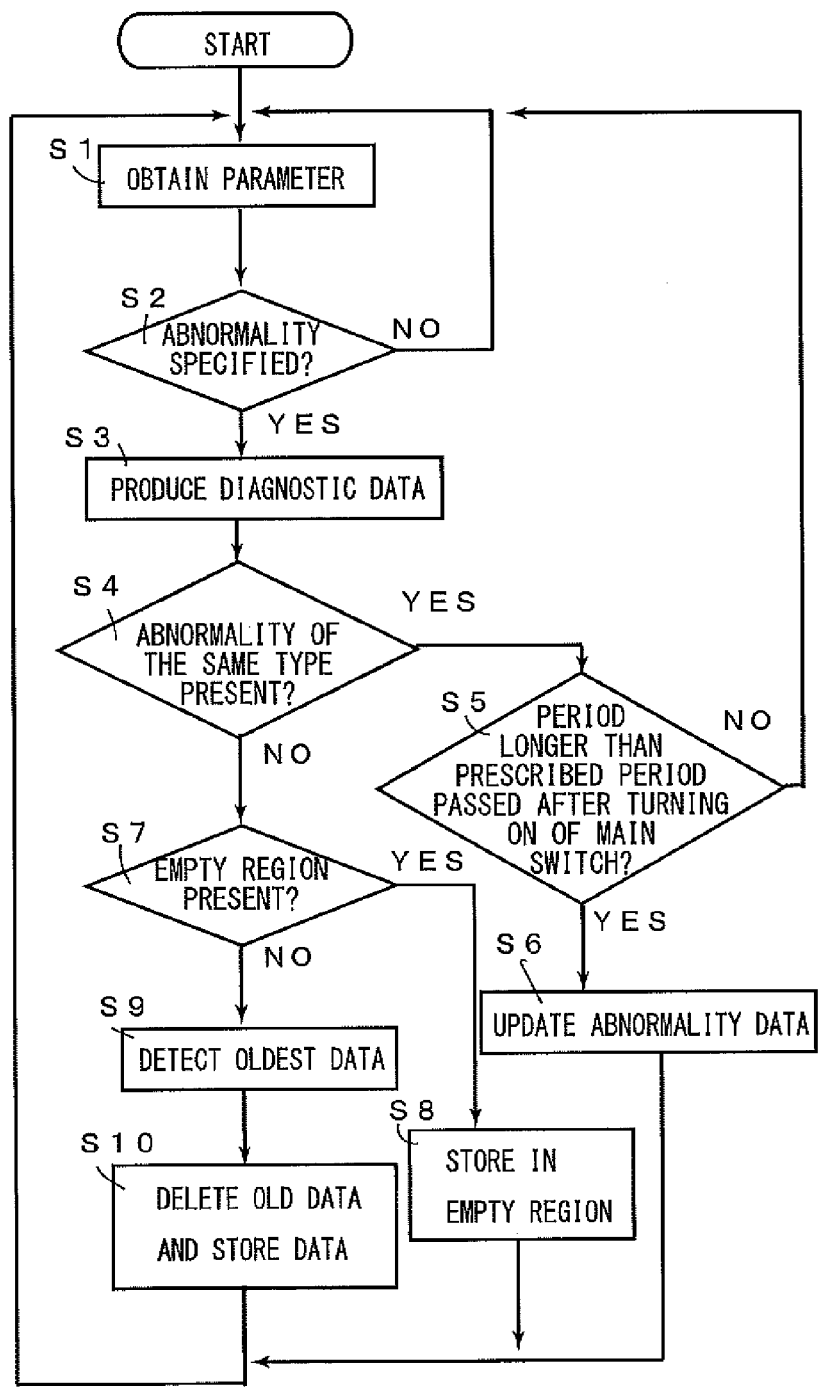
FIG. 3 is a flowchart for illustrating an operation of a vehicle information management system.

FIG. 3 is a flowchart for illustrating an operation of the vehicle information management system 2. The operation of the vehicle information management system 2 will be described in conjunction with the flowchart.

The plurality of detection sensors 21 obtain parameters related to a vehicle state. The obtaining unit 231 obtains parameters from the plurality of detection sensors 21 (step S1). When the parameters are obtained, the type of an abnormality about the vehicle is specified based on the parameters obtained by the detection sensors 21 (step S2). If there is no abnormality about the vehicle (NO in step S2), the detection sensors 21 each obtain a parameter for the vehicle again. On the other hand, if the type of the abnormality about the vehicle is specified (YES in step S2), diagnostic data is produced based on the parameters detected by the detection sensors 21 (step S3).

It is determined whether abnormality data related to an abnormality of the same type as the abnormality specified by the abnormality specifying unit 232 is already stored in the storage regions in the storage 24 (step S4). If abnormality data for an abnormality of the same type as that of the abnormality specified by the abnormality specifying unit 232 is already stored in any of the storage regions (YES in step S4), it is determined if a time longer than a prescribed period has passed after the main switch 4 was switched from off to on (step S5). If the time passed is not longer than the prescribed period (NO in step S5), parameters are once again obtained by the detection sensors 21. On the other hand, if a period longer than the prescribed period has passed (YES in step S5), occurrence number information in the abnormality data stored in the storage region is changed to the latest information by the updating unit 234 and diagnostic data is overwritten (step S6).

If abnormality data for an abnormality of the same type as that of the abnormality specified by the abnormality specifying unit 232 is not stored in the storage regions of the storage 24 (NO in step S4), it is determined whether there is an empty region in the storage 24 (step S7). If there is an empty region (YES in step S7), the abnormality data is stored in the empty region (step S8). On the other hand, if there is no empty region in storage 24 (NO in step S7), the storage region having the oldest abnormality data stored therein among all of the storage regions of the storage 24 is detected (step S9). The storage region having the oldest abnormality data stored therein is detected based on the time information of the abnormality data stored in each of the storage regions. The updating unit 234 deletes the oldest abnormality data to produce an empty region, and stores the newly produced abnormality data in the empty region (step S10).

Figure 4:
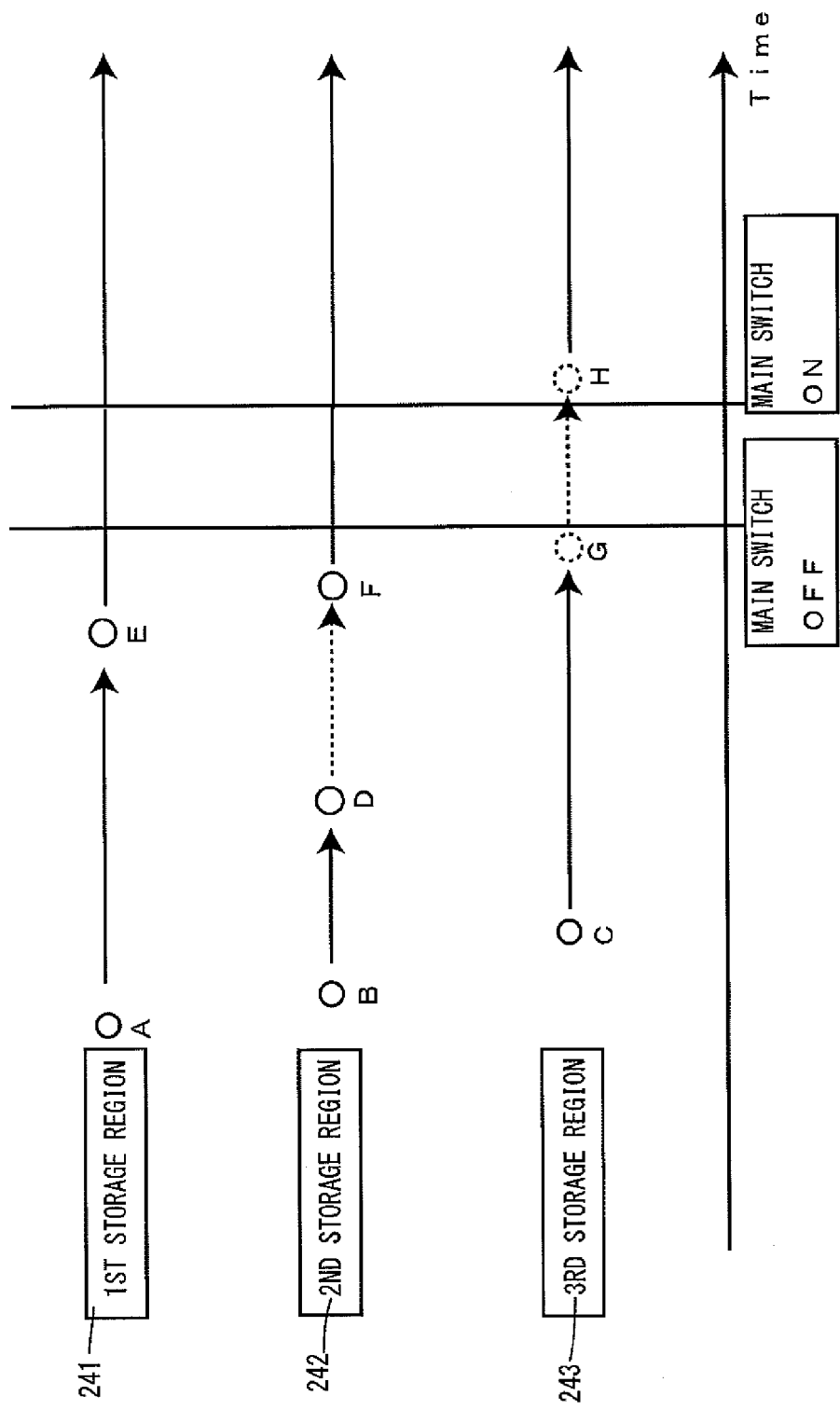
FIG. 4 is a view showing a specific example of an operation of the vehicle information management system.

FIG. 4 is a view showing an operation of the vehicle information management system 2 from the state in which no abnormality data is stored in the storage 24. In FIG. 4, the arrows following events A, B, C, D, E, F, G, and H indicate that an abnormality determined to have occurred in the vehicle continues. In FIG. 4, the portions indicated by the broken line show a state in which an abnormality determined to have occurred in the vehicle is determined to have been repaired and abnormality data is stored in a storage region.

If an abnormality designated by A, for example, occurs while no abnormality data is stored in any of the storage regions, abnormality data is stored in the first region 241. Here, abnormality data for A includes information that the abnormality type number is 13 and the number of occurrences of the abnormality is one. If the abnormality data is stored in the first storage region 241, then an abnormality designated by B occurs and diagnostic data is produced accordingly, it is determined whether abnormality data with the abnormality type number corresponding to abnormality B is stored in any of the storage regions. Here, B represents an abnormality with the abnormality type number 15. Since abnormality data with the abnormality type number 15 is not stored in any of the storage regions, the abnormality data for B is stored in the second storage region 242. The abnormality data for B includes, for example, information that the abnormality type number is 15 and the number of occurrences of the abnormality is one. While the abnormality data is stored in the first and second storage regions 241 and 242, if an abnormality designated by C occurs and diagnostic data is produced, it is determined whether abnormality data with the abnormality type number corresponding to abnormality C is stored in any of the storage regions. Here, C represents an abnormality with the abnormality type number 30. Since the abnormality data with the abnormality type number 30 is not stored in any of the storage regions, the abnormality data for C is stored in the third storage region 243. The abnormality data for C includes, for example, information that the abnormality type number is 30 and the number of occurrences of the abnormality is one. The abnormality with the abnormality type number 30 is a type of an abnormality whose recovery is difficult to easily determine, such as when an abnormality occurs in an ignition device, for example. In this case, it is automatically determined that the abnormality is recovered if the main switch 4 is switched from on to off.

Then, if an abnormality specified by abnormality data stored in the second storage region 242 is recovered, the abnormality data stored in the second storage region 242 is maintained as it is stored therein. Here, recovery of the abnormality in FIG. 4 is designated by D. Then, if an abnormality designated by E occurs and diagnostic data is produced, it is determined whether abnormality data with the abnormality type number corresponding to abnormality E is stored in any of the storage regions. Here, E is, for example, an abnormality with the abnormality type number 21. However, since abnormality data with the abnormality type number 21 is not stored in any of the storage regions and all the storage regions store abnormality data, it is determined which storage region stores the oldest abnormality data. Then, the abnormality data for A, i.e., the oldest data stored in the first storage region 241 is deleted to produce an empty region. The abnormality data is stored in the first storage region 241. Here, the abnormality data for E includes information that the abnormality type number of the abnormality is 21 and the number of occurrences of the abnormality is one.

Then, if an abnormality F (designated by the abnormality type number 15) of the same type as that of the abnormality of abnormality data stored in the second storage region 242 occurs, the occurrence number information included in the abnormality data stored in the second storage region 242 is changed to the latest information, and the diagnostic data is overwritten. Here, the abnormality data for F includes information that the abnormality type number is 15 and the number of occurrences of the abnormality is two. Abnormality data related to an abnormality of the type automatically determined to have been recovered in response to switching of the main switch 4 from on to off is stored in the third storage region 243. When the main switch 4 is switched from on to off, the abnormality designated by the abnormality type number 30 is determined to have recovered (G in FIG. 4). The detection sensors 21 detect parameters and the abnormality specifying unit 232 specifies an abnormality type. In reality, since the abnormality with the abnormality type number 30 is not repaired in FIG. 4, it is determined that the abnormality of the abnormality data stored in the third storage region 243 occurred. In FIG. 4, the detection of the occurrence of the abnormality of the abnormality data stored in the third storage region 243 is indicated by H. However, since a time longer than the prescribed time has not passed after the main switch 4 was switched from off to on, the abnormality data stored in the third storage region 243 is not updated. Therefore, the third storage region 243 stores the abnormality data for C.

Figure 5:
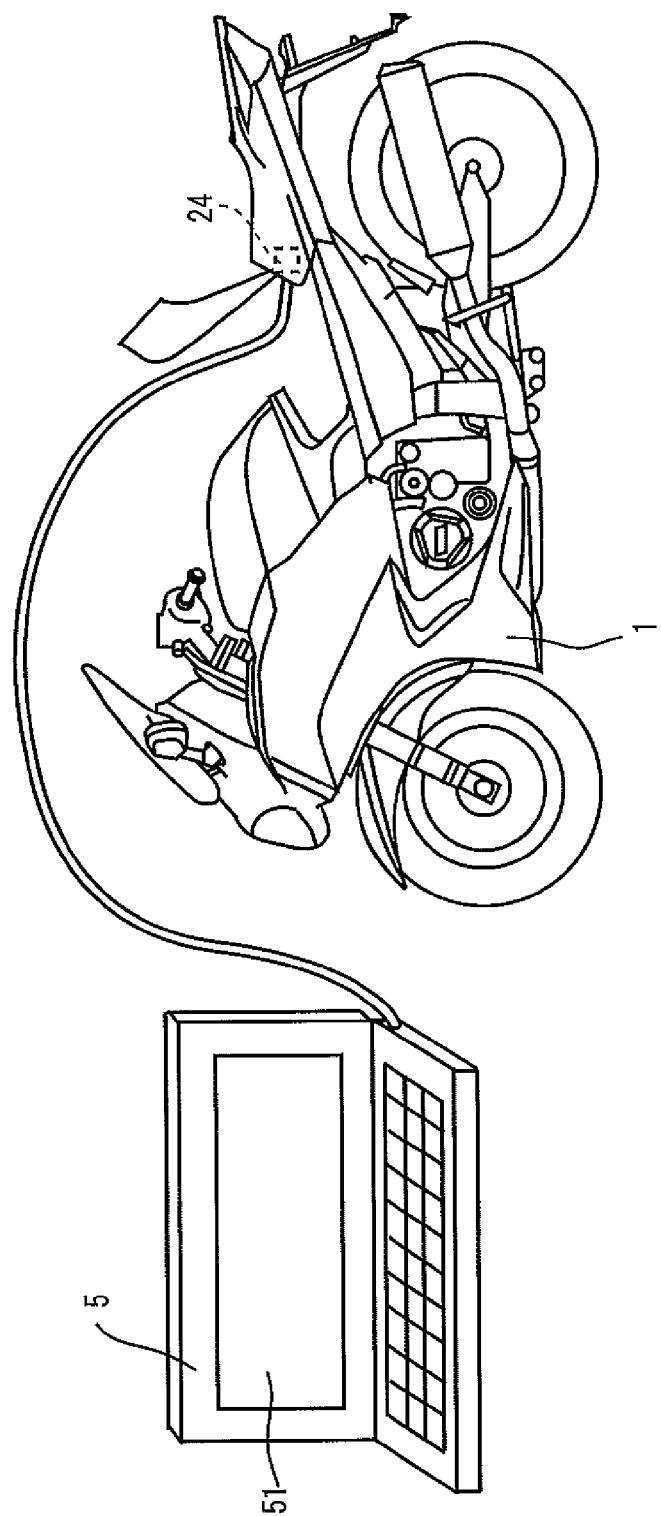
FIG. 5 shows an overall structure of a state of how the motorcycle is connected to an external device.

FIG. 5 shows a state of how the motorcycle 1 is connected to the external device 5. When a malfunction or an abnormality is specified and repaired, the motorcycle 1 communicates with the external device 5. The external device 5 reads out abnormality data stored in the storage 24 from the motorcycle 1. The external device 5 displays the abnormality data read out from the motorcycle 1 on a display 51. A repair worker that repairs a malfunction checks the location of the abnormality or content of the malfunction from the abnormality data displayed on the display 51 and repairs it. The external device 5 may be a general use PC instead of a dedicated reader, for example.

Figure 6:
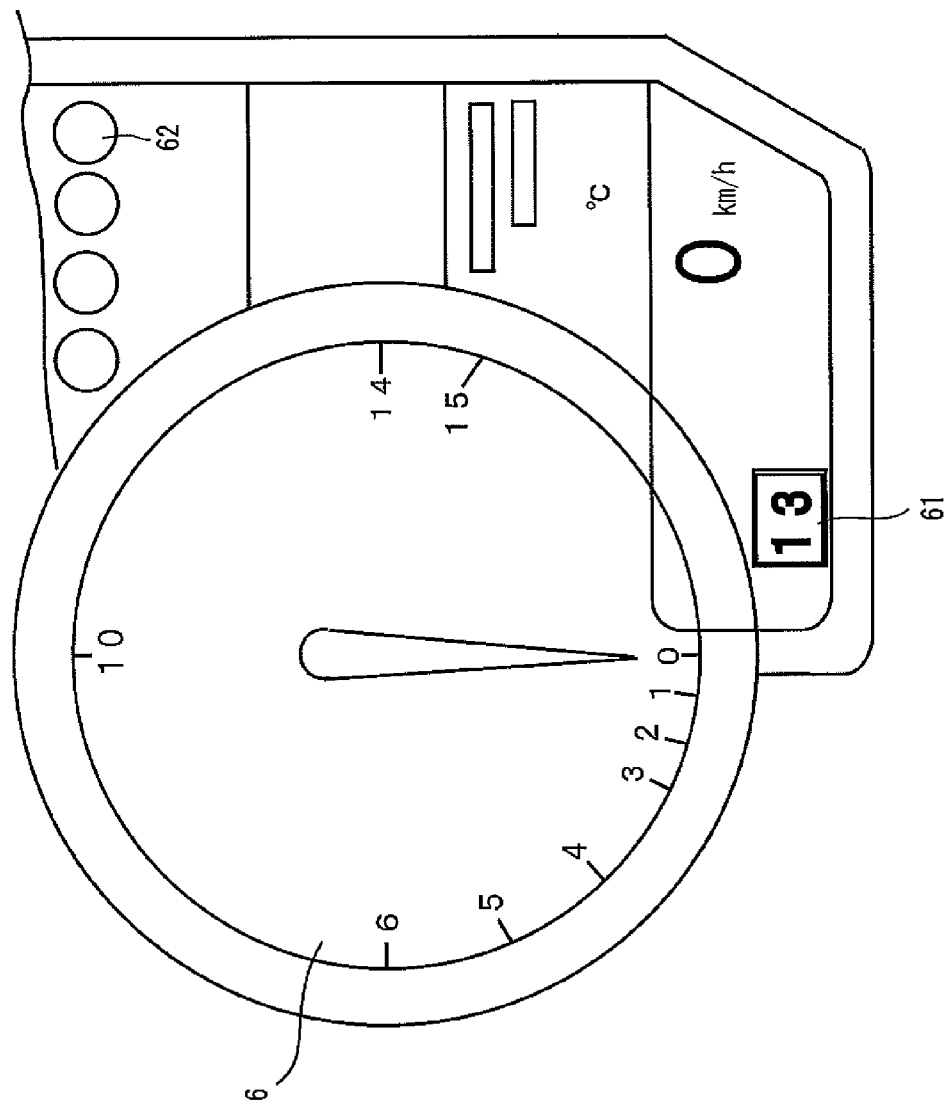
FIG. 6 is a partly enlarged front view showing a periphery of a meter of the motorcycle.

FIG. 6 is a partially enlarged front view of the meter 6 provided on the motorcycle 1. The meter 6 indicates parameters that show a state of the motorcycle 1 such as a vehicle speed. The meter 6 is provided with an abnormality warning unit 61 and an indicator 62. The abnormality warning unit 61 shows an abnormality type specified by the abnormality type specifying unit 232. The abnormality warning unit 61 lights up when the abnormality specifying unit 232 specifies an abnormality. A rider can become aware of the occurrence of an abnormality by the warning by the abnormality warning unit 61. The indicator 62 lets a rider become aware of a vehicle state such as the vehicle being low on fuel. A plurality of such indicators 62 are preferably arranged side-by-side, for example.

In the above described motorcycle 1, when a type of a new abnormality is specified and diagnostic data therefor is produced and if abnormality data for an abnormality of the same type as that of the abnormality specified by the abnormality specifying unit 232 is already stored in any of the storage regions, the diagnostic data in the storage region is overwritten and the occurrence number information is changed to the latest information. Therefore, during repair, a repair worker can determine whether the abnormality data stored in the storage region is data obtained upon detecting the abnormality for the first time by checking the occurrence number information. The repair worker can also know the number of how many times the abnormality of the same type has occurred based on the occurrence number information. Since the storage regions store the latest diagnostic data, the repair worker can carry out repairs based on the latest diagnostic data.

In the above-described motorcycle 1, abnormality data stored in a storage region includes occurrence number information. When a rider discovers the occurrence of an abnormality and takes the motorcycle 1 to a shop for repair, a repair worker can obtain information related to the occurrence frequency of the abnormality from the rider. Therefore, the repair worker can more easily determine which storage region stores abnormality data to be referred to based on the information from the rider and the abnormality data.

In the motorcycle 1, the ECU 23 automatically determines that the abnormality is repaired when the main switch 4 is switched from on to off with respect to several types of predetermined abnormalities. Then, if, for example, the ECU 23 determines the occurrence of an abnormality again in response to the switching of the main switch 4 from off to on, and the data at the time is overwritten, abnormality data obtained when a malfunction was actually generated does not remain in the storage 24. Therefore, it would be difficult for a repair worker who carries out maintenance or repairs to specify an abnormality and a malfunction based on the abnormality data stored in the storage 24.

In the above-described motorcycle 1, however, if an abnormality of the same type as that of abnormality data already stored in a storage region occurs before a period longer than a prescribed period passes after the main switch 4 is switched from off to on, the diagnostic data stored in the storage region is not updated. Therefore, the repair worker can confirm abnormality data obtained at the actual occurrence of the abnormality, so that the abnormality or malfunction can be specified more easily at the time of repair.

In the above-described motorcycle 1, if abnormality data of an abnormality of the same type as that of the abnormality data is not yet stored in the storage 24 and there is an empty region in the storage 24, the abnormality data is stored in the empty region. In the above-described motorcycle 1, if abnormality data about an abnormality of the same type as the abnormality data is not yet stored in the storage 24 and there is no empty region in the storage 24, abnormality data stored in the storage region stored with the oldest abnormality data is deleted to produce an empty region and the abnormality data is stored in the produced empty region. Therefore, new diagnostic data useful in determining an abnormality and a malfunction is more likely to remain in the storage regions. Therefore, it is easier to specify an abnormality and a malfunction when repairs or maintenance is carried out.

In the above-described motorcycle 1, abnormality data includes time information. The time information includes a time during which the ECU 23 is active, and the oldest abnormality data or the like can be detected without additionally providing a new component such as a timer.

The above-described preferred embodiments relate to the motorcycle 1, but the present invention is not limited to the preferred embodiments described above and may be applicable to a three- or four-wheeled saddle riding type vehicle, for example.

Figure 7:
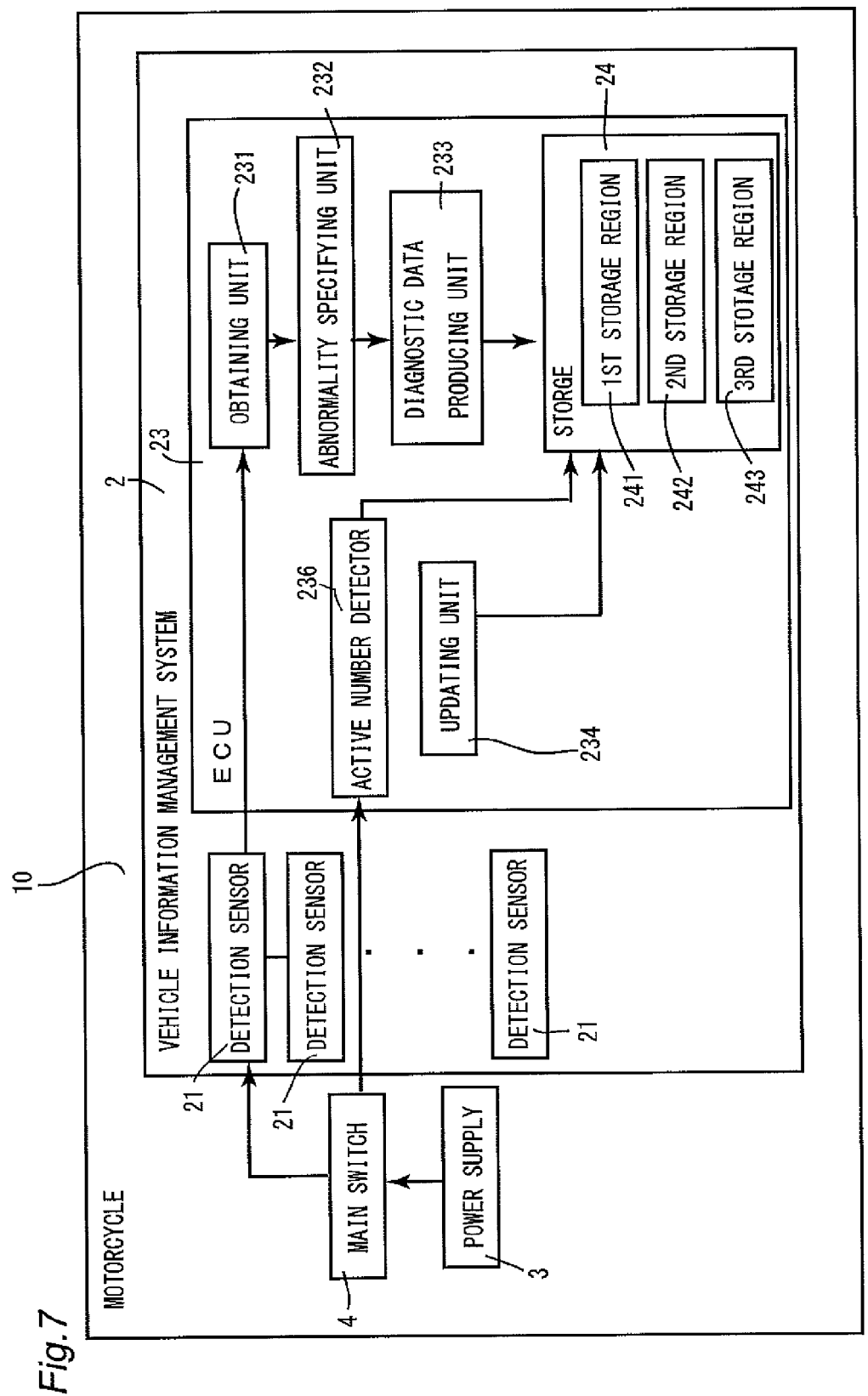
FIG. 7 is a block diagram of a motorcycle according to another preferred embodiment of the present invention.

In the motorcycle 1 according to the above described preferred embodiments, the oldest abnormality data is detected preferably based on time information included in abnormality data when the storage region stored with the oldest abnormality data is detected. The time information is detected preferably by the active time detector 235. The present invention is not limited to this arrangement, and the motorcycle may include an arrangement shown in FIG. 7. A motorcycle 10 shown in FIG. 7 includes an active number detector 236 instead of the active time detector 235. The active number detector 236 detects the number of how many times the main switch 4 is switched from off to on and produces number information. The abnormality data includes diagnostic data, type information that indicates the type of an abnormality, the occurrence number of the abnormality specified by the type information, and number information that indicates the activation number of the ECU 23. In the motorcycle 10, the storage region stored with the oldest abnormality data is detected based on the number information. In this way, the oldest data or the like can be detected without additionally providing a new component such as a timer.

In the above-described preferred embodiments, the abnormality warning unit 61 is preferably provided on the meter 6, but the present invention is not limited to this arrangement. The abnormality warning unit 61 can be provided in any location as long as a rider can recognize it and may be provided, for example, near the handle. The abnormality warning unit 61 does not have to indicate a content of the warning, but instead a lamp can function as a warning unit and may be turned on to make such a warning. For example, the indicator 62 may function as a warning unit and may light up to make a warning about an abnormality.

In the above-described preferred embodiments, it is preferably determined whether a time period longer than a prescribed time period passes after the main switch 4 is switched from off to on, and the control changes between updating and not updating a storage region. However, the present invention is not limited to this arrangement, and an arrangement without any consideration of switching of the main switch 4 may be used. However, in this case, abnormality data is updated every time the main switch 4 is switched, so that it is more difficult, for example, to specify an abnormality than the above-described preferred embodiments.

In the above-described preferred embodiments, the motorcycle 1 preferably includes a storage including three storage regions, but the present invention is not limited to this arrangement. The number of the storage regions may be one or two or four or more, for example.

In the above-described preferred embodiments, abnormality data preferably includes time information. However, the present invention is not limited to this and the time information does not have to be included in the abnormality data.

In the above-described preferred embodiments, an abnormality in an ignition device preferably is illustrated as an example of an abnormality determined to have been repaired when the main switch 4 is switched from on to off, but the present invention is not limited to this. According to a preferred embodiment of the present invention, it may be set so that all the abnormalities may be determined to have been repaired when the main switch 4 is switched from on to off, and any other abnormalities (a recovery from which may be difficult to correctly determine) may be set as such an abnormality.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle information management system that manages diagnostic data that indicates a vehicle state, the vehicle information management system comprising:
    a plurality of parameter detectors each arranged to detect a parameter related to the vehicle state;
    an abnormality specifying unit programmed to specify a type of an abnormality generated in the vehicle based on the parameters detected by the plurality of parameter detectors;
    a diagnostic data producing unit programmed to produce the diagnostic data based on the parameters detected by the plurality of parameter detectors when the type of the abnormality is specified by the abnormality specifying unit;
    a storage including a storage region arranged to store abnormality data including the diagnostic data, type information that indicates the type of the abnormality, and occurrence number information that indicates a number of occurrences of an abnormality specified by the type information; and
    an updating unit programmed to change the occurrence number information to latest information and to overwrite and save new diagnostic data in the storage region when the type of the abnormality is specified by the abnormality specifying unit and the new diagnostic data is produced, if the abnormality data of the same type as the specified type is already stored in the storage region.

2. The vehicle information management system according to claim 1, wherein when a main switch of the vehicle is turned on, the plurality of parameter detectors each start to detect a parameter of the vehicle;

the diagnostic data producing unit is programmed to produce the diagnostic data based on the parameters detected in a prescribed time period after the main switch is turned on; and when the type of the abnormality is specified by the abnormality specifying unit based on the diagnostic data produced in the prescribed time period after the main switch is turned on and the abnormality data of the same type as the specified type is already stored in the storage region, the updating unit is programmed to neither overwrite the diagnostic data in the storage region already stored with the abnormality data of the same type as the specified type nor change the occurrence number information to the latest information.

3. The vehicle information management system according to claim 1, wherein the storage includes a plurality of storage regions; and when the type of the abnormality is specified by the abnormality specifying unit and the new diagnostic data is produced, and when the abnormality data of the same type as the specified type is not stored in any of the plurality of storage regions and there is an empty region among the plurality of storage regions, the updating unit is programmed to store a new abnormality data in the empty region.

4. The vehicle information management system according to claim 3, wherein when the type of the abnormality is specified by the abnormality specifying unit and the new diagnostic data is produced, and when the abnormality data of the same type as the specified type is not stored in any of the plurality of storage regions and there is no empty region among the plurality of storage regions, the updating unit is programmed to delete an oldest abnormality data to produce an empty region and to store the new abnormality data in the empty region.

5. The vehicle information management system according to claim 4, further comprising:
an active time detector arranged to detect a time period during which an electronic control unit of the vehicle that is supplied with power in response to an operation of the main switch is active; wherein
the abnormality data further includes time information related to an active time detected by the active time detector.

6. The vehicle information management system according to claim 4, further comprising:
an active number detector arranged to count a number of how many times the electronic control unit of the vehicle that is supplied with power in response to an operation of the main switch is active; wherein
the abnormality data further includes number information related to an activation number detected by the active number detector.

7. A malfunction diagnostic system comprising: a vehicle information management system that manages diagnostic data that indicates a vehicle state, the vehicle information management system comprising: a plurality of parameter detectors each arranged to detect a parameter related to the vehicle state; an abnormality specifying unit programmed to specify a type of an abnormality generated in the vehicle based on the parameters detected by the plurality of parameter detectors; a diagnostic data producing unit programmed to produce the diagnostic data based on the parameters detected by the plurality of parameter detectors when the type of the abnormality is specified by the abnormality specifying unit; a storage including a storage region arranged to store abnormality data including the diagnostic data, type information that indicates the type of the abnormality, and occurrence number information that indicates a number of occurrences of an abnormality specified by the type information; and an updating unit programmed to change the occurrence number information to latest information and to overwrite and save new diagnostic data in the storage region when the type of the abnormality is specified by the abnormality specifying unit and the new diagnostic data is produced, if the abnormality data of the same type as the specified type is already stored in the storage region; a reader arranged to read the abnormality data stored in the storage from the vehicle information management system; and a display that displays the abnormality data read from the vehicle information management system.

8. A saddle riding type vehicle comprising:
a vehicle information management system that manages diagnostic data that indicates a vehicle state, the vehicle information management system comprising: a plurality of parameter detectors each arranged to detect a parameter related to the vehicle state; an abnormality specifying unit programmed to specify a type of an abnormality generated in the vehicle based on the parameters detected by the plurality of parameter detectors; a diagnostic data producing unit programmed to produce the diagnostic data based on the parameters detected by the plurality of parameter detectors when the type of the abnormality is specified by the abnormality specifying unit; a storage including a storage region arranged to store abnormality data including the diagnostic data, type information that indicates the type of the abnormality, and occurrence number information that indicates a number of occurrences of an abnormality specified by the type information; and an updating unit programmed to change the occurrence number information to latest information and to overwrite and save new diagnostic data in the storage region when the type of the abnormality is specified by the abnormality specifying unit and the new diagnostic data is produced, if the abnormality data of the same type as the specified type is already stored in the storage region.

9. The saddle riding type vehicle according to claim 8, further comprising a warning unit arranged to warn a rider about the abnormality, wherein the warning unit lights up when the type of the abnormality is specified by the abnormality specifying unit.

10. A vehicle information management method for managing diagnostic data that indicates a vehicle state, the method comprising the steps of:
detecting a parameter related to the vehicle state;
producing the diagnostic data based on the detected parameter;
specifying a type of an abnormality generated in the vehicle based on the diagnostic data; and
changing occurrence number information to latest information and then overwriting and saving a new diagnostic data in a storage region when the new diagnostic data is produced and abnormality data of the same type as the specified type is already stored in the storage region.

* * * * *